(12) United States Patent
Krause et al.

(10) Patent No.: US 8,590,344 B2
(45) Date of Patent: Nov. 26, 2013

(54) METHOD FOR THE PRODUCTION OF A CYLINDER MADE FROM QUARTZ GLASS USING A RETAINING DEVICE, AND RETAINING DEVICE

(75) Inventors: Thomas Krause, Wolfen (DE); Udo Peper, Halle/Saale (DE); Steffen Zwarg, Wolfen (DE); René Sowa, Pouch (DE)

(73) Assignee: Heraeus Quarzglas GmbH & Co. KG, Hanau (DE)

( * ) Notice: Subject to any disclaimer, the term of this patent is extended or adjusted under 35 U.S.C. 154(b) by 330 days.

(21) Appl. No.: 12/736,970

(22) PCT Filed: May 14, 2009

(86) PCT No.: PCT/EP2009/055805
§ 371 (c)(1),
(2), (4) Date: Nov. 23, 2010

(87) PCT Pub. No.: WO2009/141259
PCT Pub. Date: Nov. 26, 2009

(65) Prior Publication Data
US 2011/0072852 A1  Mar. 31, 2011

(30) Foreign Application Priority Data
May 23, 2008  (DE) .......................... 10 2008 024 842

(51) Int. Cl.
*C03B 37/018* (2006.01)
(52) U.S. Cl.
USPC .................... 65/416; 65/421; 65/427; 65/531
(58) Field of Classification Search
USPC ........... 65/413, 414, 421, 427, 529, 530, 531, 65/534, 31, 57, 416
See application file for complete search history.

(56) References Cited

U.S. PATENT DOCUMENTS

| 4,157,906 A | 6/1979 | Bailey |
| 5,665,132 A | 9/1997 | Ruppert et al. |

(Continued)

FOREIGN PATENT DOCUMENTS

| DE | 197 36 949 C1 | 1/1990 |
| DE | 196 49 935 A1 | 6/1998 |

(Continued)

OTHER PUBLICATIONS

Espacenet English language abstract of DE 19736949 published Jan. 21, 1999.

(Continued)

*Primary Examiner* — Richard Crispino
*Assistant Examiner* — Yana Belyaev
(74) *Attorney, Agent, or Firm* — Tiajoloff and Kelly LLP

(57) ABSTRACT

The invention relates to a known method for the production of a cylinder from quartz glass, comprising a step, wherein an $SiO_2$ body which comprises a porous $SiO_2$ soot layer and has a lower end, an upper end, and an outer casing, is sintered to form said quartz glass cylinder in a vitrification furnace, and is being held in a vertical orientation by means of a retaining device, which comprises an upper retaining element connected at the upper end of the $SiO_2$ body, and a lower retaining element disposed on the lower end. In order to provide a method based thereon, by means of which even heavy bodies made of porous $SiO_2$ can be safely retained during vitrification, the invention provides that the retaining device has a dimensionally stable connecting part, which extends inside the vitrification furnace along the outer casing of the $SiO_2$ body and which connects the upper and the lower retaining elements to each other.

16 Claims, 3 Drawing Sheets

(56) References Cited

U.S. PATENT DOCUMENTS

Figure 1:
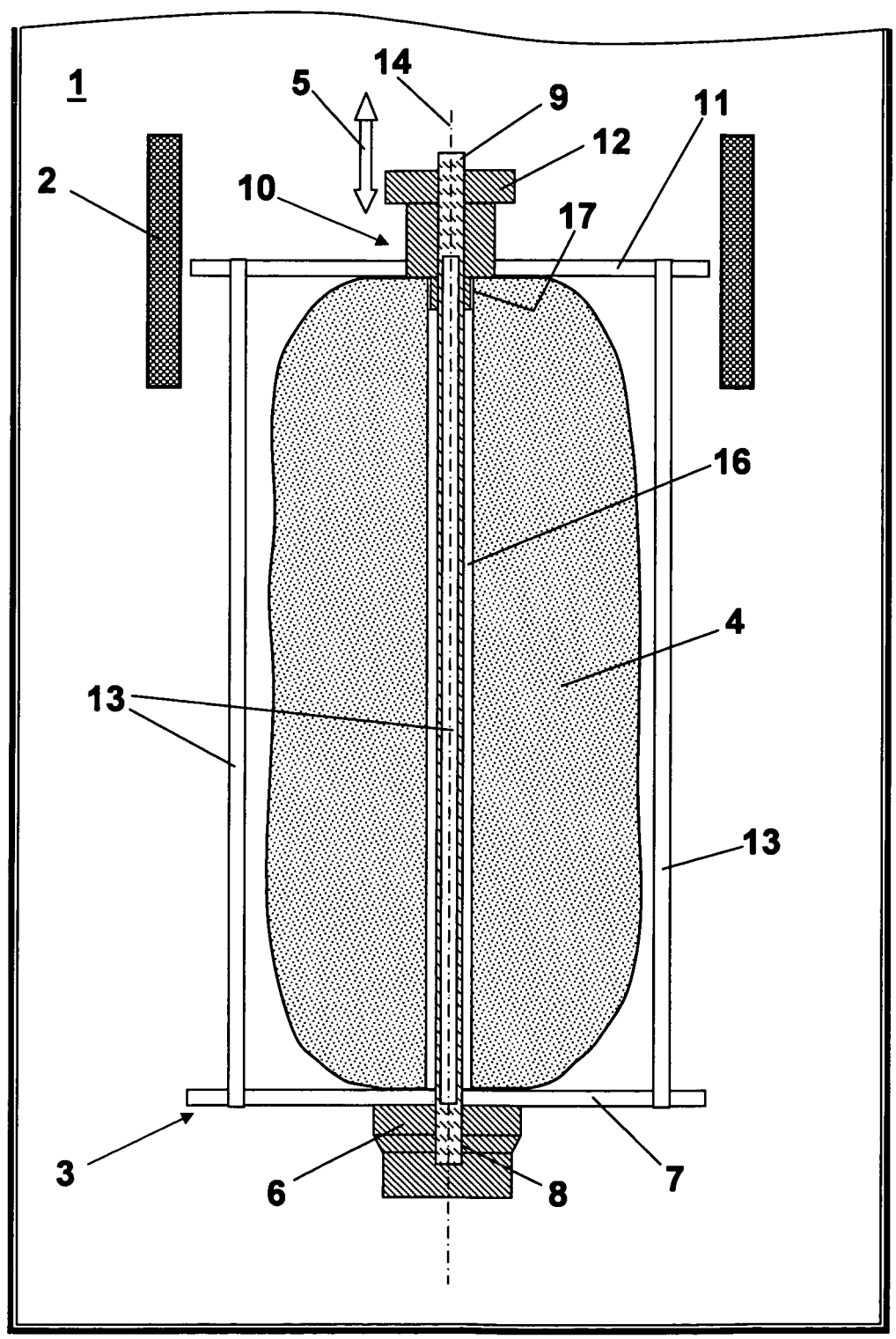

| | | | |
|---|---|---|---|
| 5,837,024 A | 11/1998 | Fabian | |
| 7,992,413 B2 * | 8/2011 | Hino | 65/416 |
| 2005/0120752 A1 * | 6/2005 | Brown et al. | 65/397 |
| 2007/0271964 A1 * | 11/2007 | Huenermann | 65/494 |

FOREIGN PATENT DOCUMENTS

| | | | | |
|---|---|---|---|---|
| DE | 103 02 290 B3 | 7/2004 | | |
| DE | 102004035086 A1 | 2/2006 | | |
| EP | 701 975 A2 | 3/1996 | | |
| WO | WO 2006008139 A1 * | 1/2006 | | C03B 19/14 |

OTHER PUBLICATIONS

Espacenet English language abstract of DE 10302290 published Jul. 29, 2004.

* cited by examiner

METHOD FOR THE PRODUCTION OF A CYLINDER MADE FROM QUARTZ GLASS USING A RETAINING DEVICE, AND RETAINING DEVICE

DESCRIPTION

The present invention relates to a method for producing a cylinder of quartz glass, comprising a method step in which a $SiO_2$ body, which comprises a porous $SiO_2$ soot layer and has a lower end, an upper end and an outer jacket, is sintered in a vitrification furnace to obtain the quartz glass cylinder and is held in this process by means of a holding device in vertical orientation, which holding device comprises an upper holding element attached to the upper end of the $SiO_2$ body and a lower holding element arranged on the lower end.

Furthermore, the present invention relates to a holding device for holding a $SiO_2$ body, which comprises a porous $SiO_2$ soot layer and has a lower end, an upper end and an outer jacket, in a furnace in vertical orientation, the holding device comprising an upper holding element attached to the upper end of the $SiO_2$ body and a lower holding element arranged at the lower end of the $SiO_2$ body.

PRIOR ART

Cylinders of synthetic quartz glass are used as intermediate products for making preforms for optical fibers. In the so-called "soot method", their production includes a deposition process with formation of a porous blank of $SiO_2$ particles (here designated as "soot body" or as "soot tube") and a vitrification process for vitrifying the soot body to obtain a hollow cylinder of quartz glass. The vitrification of the soot tube (also called "vitrification") may also be performed such that the inner bore of the soot tube collapses, whereby a solid cylinder is obtained.

The vitrification of a soot tube is e.g. described in U.S. Pat. No. 4,157,906 A. Disclosed is a method and a device, wherein a $SiO_2$ soot tube is sintered in a method step, the inner bore is collapsed in this process and simultaneously elongated to obtain a fiber. For mounting the $SiO_2$ soot tube in a drawing and vitrification furnace in vertical orientation, a tube section of quartz glass having a length of about 50 mm is inserted into the inner bore of the soot tube, the outer diameter of said tube section corresponding approximately to the inner diameter of the inner bore, and which comprises hump-like thickened portions at its end intended for insertion into the inner bore. To anchor the quartz glass tube, the hump-like thickened portions are turned in the inner bore by about 90°, resulting in a positive connection resembling a bayonet lock. The soot tube is held suspended on the turned-in holder at its upper end and is supplied to a heating zone, starting with its lower end, and is softened therein zone by zone and elongated into a fiber.

When the tube section is turned into the wall of the soot tube, particles are generated that deposit on the inner wall of the soot tube and may be unfavorably noticed in the further process. Moreover, breakouts and cracks may occur that make the soot tube useless or that may later induce a breaking out of the holder.

It has also been suggested (DE 196 49 935 A1) that a holder of quartz glass should already be embedded during the deposition process in the evolving soot body in such a way that it projects on the face end out of the soot body to be vitrified and can thereby be used for the suspended mounting of the soot body in the subsequent process steps. The embedment of the holder is however difficult to reproduce and the strength can hardly be checked. Attention must here be paid that increasingly larger quartz glass cylinders are desired for enhancing productivity, so that the weights of the soot tubes to be vitrified are also continuously increasing. The mounting of heavy soot tubes is difficult in the above-described procedures.

In the method known from EP 701 975 A2, the soot tube is held by means of a holding device in a vitrification furnace in vertical orientation, the holding device comprising a support rod which extends from the top through the inner bore of the soot tube and which is connected to a holding base on which the soot tube is initially standing with its lower end. The support rod consists of carbon fiber reinforced graphite (CFC; carbon fiber reinforced carbon) and is surrounded by a gas-permeable thin-walled cladding tube of pure graphite. In a position above the upper end of the cladding tube an inwardly projecting graphite support ring is embedded into the inner bore of the soot tube. During vitrification the soot tube is vitrified zone by zone, starting with its upper end. In this process the soot tube is successively collapsing onto the cladding tube of graphite and is also shrinking in its length, with the tube standing on the holding base in a first vitrification phase. The position of the graphite support ring, which is embedded in the soot tube, is chosen such that the ring is supported on the cladding tube of graphite in a second vitrification phase on account of the increasing longitudinal shrinkage, so that the soot tube is then suspended from the upper end.

In a modification of this method according to DE 103 02 290 B3, it is additionally intended that a cladding of synthetic quartz glass is positioned between the holding rod and the soot tube during vitrification.

To enhance productivity, large-volume and thick-walled quartz glass cylinders are more and more desired with a ratio that is as great as possible between outer and inner diameter. In the course of this development the inner diameter of the soot tubes is getting smaller and smaller and the weight larger and larger. However, when heavy soot tubes are held by means of a thin support rod, the tensile strength or bending stiffness thereof turns out to be a limiting factor. Here the known method comes up against limits and requires a mechanically stable, i.e. thick, support rod for the vitrification of heavy soot tubes so as to prevent breakage or bending.

This difficulty is avoided in a procedure of the above-mentioned type as is known from DE 197 36 949 C1. To hold a soot tube in a vitrification furnace, a holding device is suggested that is similar to a "vertically oriented lathe". For this purpose tubular holders are used at the lower end and at the upper end in the inner bore of the soot tube and are firmly connected to the soot tube. A corresponding chuck of the "vertically oriented lathe" by means of which the soot tube is held in vertical orientation is acting on each holder. For a zonewise vitrification either the heating zone is guided, starting from one end of the soot tube, along said tube or, in a kinematic reversal, the soot tube is passed through the stationary heating zone. Since the holders are kept in the chucks of the lathe, their distance relative to one another can be kept constant or changed during vitrification. Since the soot tube is suspended from the upper holder and supported by the lower holder at the same time, relatively small weights are acting on the softened region of the soot tube, so that deformation can be avoided during vitrification.

The known method requires a tension-resistant fixation of the holder in the inner bore of the soot tube. The "vertically oriented lathe" is relatively complicated in its construction, and it extends with the chucks into the interior of the vitrification furnace, which may lead to contamination of the soot tube.

Similar problems are observed in the vitrification of other tubes of porous $SiO_2$ that have not been produced via the $SiO_2$ soot process route, e.g. in porous $SiO_2$ bodies that have been obtained via the known sol-gel route or by pressing methods or also in composite tubes consisting of an inner tube of quartz glass and a porous $SiO_2$ layer applied thereto.

TECHNICAL OBJECT

It is therefore the object of the present invention to provide a simple method for producing a cylinder of quartz glass, by means of which even heavy $SiO_2$ bodies can be safely held during vitrification.

Moreover, it is the object of the present invention to provide a constructionally simple and operationally reliable holding device for performing the method.

As for the method, this object, starting from the aforementioned method, is achieved according to the invention in that the holding device comprises a dimensionally stable connection member which extends inside the vitrification furnace along the outer jacket of the $SiO_2$ body and which interconnects the upper holding element and the lower holding element.

The $SiO_2$ body to be held is positioned between the upper and the lower holding element. In contrast to the known methods, in the method according to the invention the forces for holding the $SiO_2$ body are carried fully or for the greatest part by means of a dimensionally stable connection member that extends between the lower and the upper holding element, namely outside the $SiO_2$ body and inside the vitrification furnace.

Therefore, without regard to the inner diameter of a possible inner bore, this connection member can have a wall thickness in conformity with the corresponding requirements, i.e. particularly also a great wall thickness, and exhibit a correspondingly high mechanical strength. The dimensional stability of the connection member ensures the observance of a given distance between the upper and the lower holding element. The dimensional stability of the connection member manifests itself in an appropriately high tensile strength and bending stiffness also at the high temperatures needed for vitrification.

As a result, one need not take any measures for holding the $SiO_2$ body, in the case of which the holding forces are substantially carried on the inner bore of the $SiO_2$ body, or in the case of which the holding forces are substantially carried by means of a holding rod that extends through the inner bore and is connected to the holding base. A sagging of an excessively thin holding linkage, as may occur in the prior art in the case of heavy soot bodies, is thereby avoided.

Apart from the fact that the adjustment of a sufficiently high mechanical strength of the mounting need not depend on the diameter of a possible inner bore of the $SiO_2$ body, the method according to the invention offers the further advantage that the efforts for treating the inner bore of the $SiO_2$ body for the purpose of fixing a holding element are diminished or can be omitted altogether. Moreover, the standard vitrification linkage in the inner bore, such as for instance the CFC or graphite components known from the prior art, can be dispensed with, so that the accompanying contaminations of the $SiO_2$ body can be avoided.

The connection member consists of one or several components. The upper and the lower holding element as well as the connection member are present as separate components that are detachable from one another, or they are made integral. It is essential that the component combination consisting of upper and lower holding element and of the connection member can be positioned inside the heating zone of the vitrification furnace.

The holding device is used during the vitrification of the $SiO_2$ body or in other process steps, such as dehydration, a doping process, or for the transportation of the $SiO_2$ body.

The vitrification of the $SiO_2$ body containing a porous $SiO_2$ layer within the meaning of the invention consists in vitrifying the $SiO_2$ body entirely or in part. A partial vitrification can serve the partial fusion of a mounting onto the upper end of the $SiO_2$ body for holding the $SiO_2$ body in successive process steps.

During sintering of the soot body in vertical orientation it may happen that the soot body collapses. To prevent such a situation, either the soot body itself comprises portions of a high dimensional stability, such as e.g. an inner region in the form of a quartz glass layer, or the upper holding element attached to the upper end of the $SiO_2$ body engages the upper $SiO_2$ body end during at least one phase of the vitrification process, i.e. either the outer wall, the front face or a possible inner bore of the $SiO_2$ body. It thereby helps to hold the upper end at a predetermined, also variable, height position, so that a sagging under its own weight is prevented during vitrification.

In a preferred procedure, it is intended that the upper holding element, the lower holding element and the connection member form a frame around the $SiO_2$ body.

The frame ensures a sufficient dimensional stability of the holding device. In the simplest case it is configured as a bracket surrounding the $SiO_2$ body, which encloses the $SiO_2$ body at both face ends, and which can also be open at the side. The frame can move upwards and downwards within the furnace and can be rotated about the longitudinal axis of the furnace.

Preferably, the upper holding element and the lower holding element are plate-shaped, cruciform or star-shaped and interconnected by means of holding rods.

Holding rods offer the advantage over connection members of a flat configuration that they have a reduced impact on the action of the heating zone during vitrification. The holding rods extend here in parallel with one another along the outer jacket of the $SiO_2$ body, or they form struts with one another or with other connection members, with formation of a cage- or scaffold-like structure having a high bending stiffness and dimensional stability.

A method variant is preferred in which the $SiO_2$ body is standing on the lower holding element at the beginning of the vitrification process.

When the $SiO_2$ body is standing on the lower holding element, the element carries the weight of the body and diverts it upwards via the connection member. The connection member is here tension-loaded. This is e.g. the state during transportation of the $SiO_2$ body that has not been vitrified yet, or at the beginning of the vitrification process.

The holding device can be held both in suspended fashion and in standing fashion inside the vitrification furnace. It has turned out to be particularly advantageous when a holding device is used in which the upper holding element is provided with a suspension that is movable in vertical direction.

With the help of the suspension the holding device is on the whole movable in suspended fashion within the vitrification furnace. A movement in vertical direction is here particularly desired, e.g. in order to permit a zonewise vitrification of the $SiO_2$ body, in that said body is moved through a heating zone. It should be noted in this context that the method according to the invention using the holding device is equally suited for an isothermal vitrification of the $SiO_2$ body, wherein the $SiO_2$ body is vitrified over its whole length simultaneously in an elongated heating zone.

For mounting a $SiO_2$ body with an inner bore it is preferably intended that the upper holding element is provided with a fixing element that engages the inner bore of the $SiO_2$ body.

The fixing element is connected to the upper holding element or is part thereof. It engages into the inner bore of the $SiO_2$ body. The fixing element serves here not only the temporary or permanent suspension of the soot body from the upper holding element, but also serves to center or align the $SiO_2$ body. As a result the $SiO_2$ body is suspended from the holding element right from the beginning or it may be suspended from the upper holding element on account of its longitudinal shrinking in the course of the vitrification process. The weights that are then acting on the fixing element are diverted upwards via the holding element and a mounting attached thereto. The connection member (e.g. lateral holding rods) is here not loaded.

In a preferred modification of this method variant it is intended that the lower holding element is also provided with a fixing element which engages the inner bore of the $SiO_2$ body.

The fixing element is connected to the lower holding element or is part thereof. It acts on the lower end of the inner bore of the $SiO_2$ body. The fixing element also serves to center or align the $SiO_2$ body or to fix the lower end in axial direction. In the last-mentioned case a lifting of the $SiO_2$ body from the lower holding element is prevented or limited during vitrification due to shrinkage, so that the length of the vitrified $SiO_2$ body is substantially determined by the distance between the lower or the upper holding element. Hence, the holding elements prevent the $SiO_2$ body from collapsing, and they contribute to the formation of the vitrified $SiO_2$ body and to geometric stabilization during vitrification.

Furthermore, it has turned out to be useful for the mounting of a $SiO_2$ body comprising an inner bore when the holding device comprises a cylindrical forming element which extends through said inner bore between lower holding element and upper holding element.

The forming element primarily serves to predetermine the geometry of the inner bore of the $SiO_2$ body after vitrification in that the $SiO_2$ body shrinks onto the forming element during vitrification, as is also known from the prior art. The forming element, however, does not have to carry any mechanical loads in axial direction, so that it can be provided with a relatively small outer diameter or with a comparatively thin wall. The inner bore of the $SiO_2$ body can thus have any desired narrow configuration. The use of such a forming element is particularly advantageous when the geometry of the inner bore has to be exactly observed, as for instance in the case of cylinders for the production of preforms for optical fibers or in the case of cylinders from which tubes of a high dimensional stability are to be drawn. This may e.g. be a tube of graphite or a thin-walled quartz glass tube (or a quartz glass rod). The forming element can extend through the inner bore or can be fixed and centered by means of the upper and lower holding element.

In a particularly preferred method variant, it is intended that the $SiO_2$ body is present as a composite body consisting of an inner cylinder of quartz glass and a $SiO_2$ soot layer, the $SiO_2$ soot layer being applied to the outer cylinder jacket of the inner cylinder of quartz glass.

Sintering is preferably carried out such that the inner cylinder substantially maintains its geometry. It thereby contributes to the dimensional stabilization of the $SiO_2$ soot layer that is applied to its outer jacket surface. The inner cylinder prevents or reduces, for instance, a collapsing of the $SiO_2$ soot layer and a shrinking of the $SiO_2$ soot layer in the direction of the longitudinal axis of the cylinder. As a result, a suspended mounting of the $SiO_2$ soot body on the upper end can be omitted in this embodiment. The inner cylinder of quartz glass is a tube or a rod (e.g. a so-called core rod for preform production).

As for the holding device, the above-indicated object is achieved according to the invention in that the holding device comprises a dimensionally stable connection member which extends inside the vitrification furnace along the outer jacket of the $SiO_2$ body and which interconnects the upper holding element and the lower holding element.

The holding device according to the invention comprises a connection member extending inside the furnace, but outside the $SiO_2$ body to be held, between the upper and the lower holding element. The forces needed for holding the $SiO_2$ body are carried fully or for the greatest part by means of this dimensionally stable connection member.

An essential advantage of the holding device according to the invention over the known holding devices is that without regard to the inner diameter of a possible inner bore of the $SiO_2$ body the connection member can have a wall thickness according to the corresponding requirements, i.e. particularly also a large one, and can have a correspondingly high mechanical strength. The dimensional stability of the connection member ensures the observance of a given distance between the upper and the lower holding element. This manifests itself in an appropriately high tensile strength and bending stiffness also at the high temperatures needed for vitrification.

A further advantage must be seen in that there is no need for measures for holding the $SiO_2$ body, in the case of which the holding forces are substantially carried on the inner bore of the $SiO_2$ body, or in the case of which the holding forces are substantially carried by means of a holding rod that extends through the inner bore and is connected to a holding base. A sagging of an excessively thin holding linkage, as may happen in the prior art in case of heavy soot bodies, is thereby avoided.

A further advantage is achieved in that the standard vitrification linkages in the inner bore, e.g. the CFC or graphite components known from the prior art, can be dispensed with, so that accompanying contaminations of the $SiO_2$ body can thereby be avoided.

The upper and the lower holding element and the connection member are present as separate components that can be detached from one another, or they are made integral. It is essential that the component combination consisting of upper and lower holding element and connection member can be positioned inside the heating zone of the vitrification furnace.

Advantageous developments of the holding device according to the invention become apparent from the sub-claims. If designs of the holding device indicated in the sub-claims imitate the procedures mentioned in sub-claims with respect to the method of the invention, reference is made for a supplementary explanation to the above observations regarding the corresponding method claims.

EMBODIMENT

Figure 2:
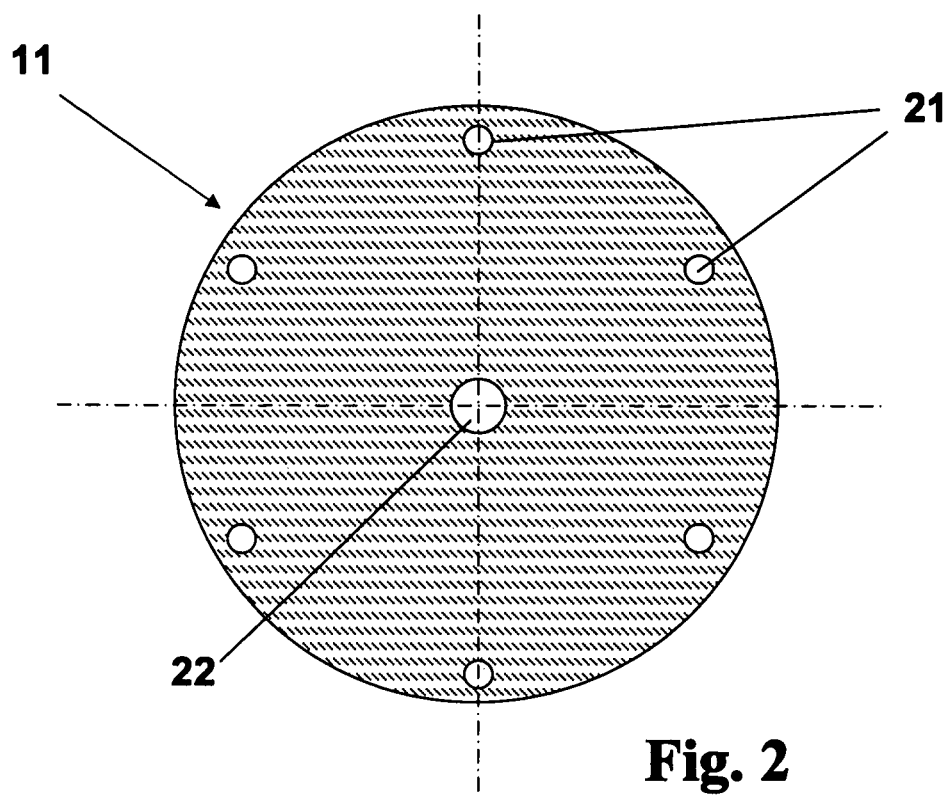
Figure 4:
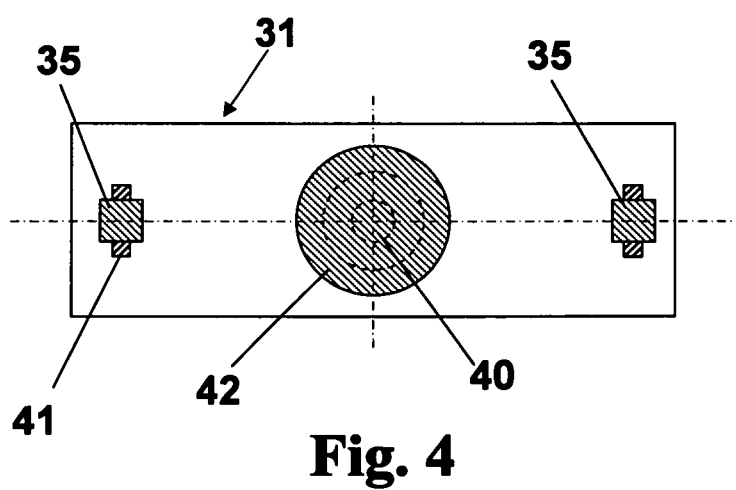
Figure 3:
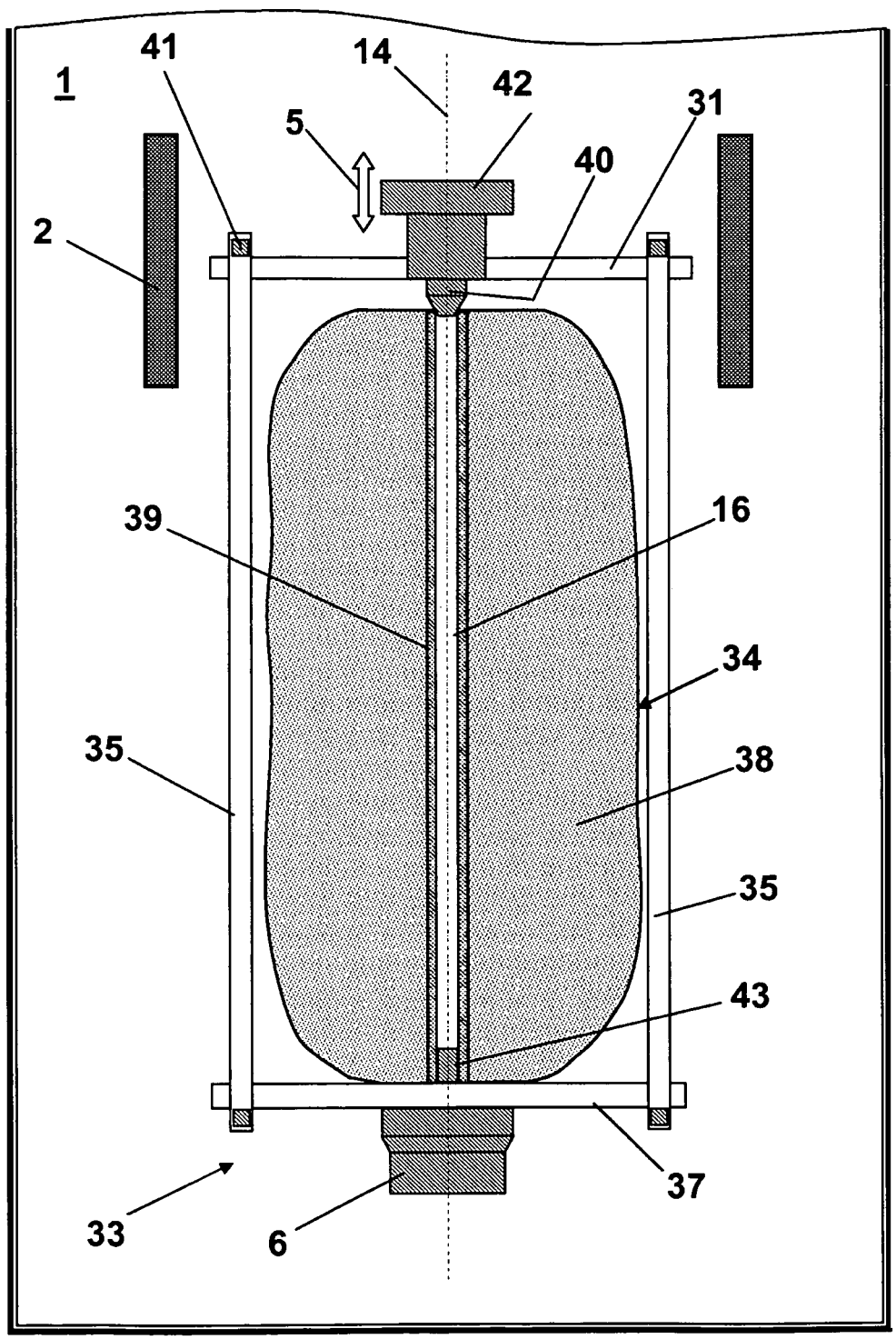

The present invention shall now be explained in more detail with reference to embodiments and a drawing. Schematically shown is in FIG. 1 a first embodiment of the holding device according to the invention in a side view;

FIG. 2 a top view on an upper holding plate, which is part of the holding device according to FIG. 1;

FIG. 3 a further embodiment of the holding device according to the invention in a side view; and FIG. 4 the embodiment according to FIG. 3 in a top view on the holding device.

FIG. 1 shows a furnace chamber 1 enveloped by a furnace jacket, which comprises an annular, stationary heating zone 2 and a holding device for a soot body 4, the device being provided with reference numeral 3 on the whole.

The holding device is movable upwards and downwards inside the furnace chamber 1 and the heating zone 2 in the direction of the longitudinal axis 14, as is demonstrated by the directional arrow 5. It comprises a holding base 6 of graphite, the horizontally oriented surface of which has attached thereto a lower circular holding plate 7. The holding base 6 is provided with an internal thread 8 into which the external thread of a forming rod 9 extends. The opposite end of the forming rod 9 projects through the central opening of a graphite nut 10, which is fastened to an upper circular holding plate 11.

The forming rod 9 consists of graphite and has an outer diameter of 30 mm. The rod extends through the inner bore 16 of the soot body 4, which has a diameter of 35 mm, and it extends in a direction coaxial to the longitudinal axis 14.

The graphite nut 10 is provided with a holding knob 12 which is engaged by a pulling element (not shown in the drawing) for moving the holding device 3 on the whole within the furnace chamber 1, as has been described above. The lower end of the graphite nut 12 comprises a holding pin 17 with an outer diameter of 34 mm, which extends over a length of about 40 mm into the inner bore 16 of the soot body 14.

Upper holding plate 11 and lower holding plate 7 are interconnected via a total of six holding rods 13 that are evenly distributed around the circumference of the circular holding plates 7, 11 and that extend in parallel with one another and relative to the longitudinal axis 14. The holding rods have a circular cross-section with a diameter of 30 mm. The holding plates 7, 11 consist of graphite and the holding rods 13 consist of carbon fiber reinforced carbon (CFC).

FIG. 2 is a top view on the holding plate 11 with the central inner bore 22 as a passage for the forming rod 9 and with threaded bores 21 that are evenly distributed over the circumference and in which the holding rods 13 are secured that are each provided with opposed threads on their two ends for this purpose.

An embodiment for the method according to the invention for making a quartz glass body using the embodiments shown in FIGS. 1 and 2 of the holding device shall now be explained in more detail.

A soot body 4 with a length of about 3 m and an inner bore 16 with a diameter of 35 mm is produced by flame hydrolysis of $SiCl_4$ by means of a conventional OVD method. A transparent quartz glass tube is produced by vitrification from the soot body 16 obtained in this way, which has a density of about 27% of the density of quartz glass. To this end the soot body 4 is introduced into the vitrification furnace 1 and is held therein by means of the holding device 3 with a vertically oriented longitudinal axis 14. The movement of the holding device 3 together with the soot body 4 held therein is carried out by means of a pulling element that engages the graphite nut 10 and is formed as a chain of CFC.

With the help of the chain of CFC the holding device 3 and the soot body 4, starting with its upper end, are continuously drawn from the bottom to the top through the heating zone 2 at a speed of 5 mm/min and are heated and sintered therein zone by zone. The temperature in the heating zone 2 is here preset to about 1500° C. The internal pressure inside the vitrification furnace is held at about 0.1 mbar during vitrification by way of continuous evacuation.

During a first vitrification phase the soot body 4 is standing on the lower holding plate 7 and the holding base 6. The weight of the soot body 4 is here carried by means of the holding rods 13 and the holding plates 7, 11 via the graphite nut 10. During vitrification the upper end of the soot body 4 is first collapsing onto the forming rod 9. At the same time, due to radial shrinkage of the soot layer, a positive or non-positive connection is established between the holding pin 17 of the graphite nut 12 and the inner bore 16 of the soot body, which is enough for holding the sintering soot body 4 in suspended fashion.

In the course of the further vitrification process the lower end of the soot body 4 is lifted from the lower holding plate 7 due to longitudinal shrinkage, so that the further vitrification process is carried out with the soot body 4 being held suspended. The weight of the soot body 4 is here carried via the holding pin 17 and the graphite nut 10.

The forming rod 9, which simultaneously serves to center the soot body 4 to be sintered in the middle, is at no time subjected to any pressure or tension. It is removed after vitrification, resulting in a hollow cylinder of quartz glass with an inner bore having a diameter of 30 mm. The hollow cylinder of quartz glass is suited for overcladding a core rod for fiber drawing or for making a preform or for use in the manufacture of a lens blank for microlithography.

FIG. 3 shows a modification of the holding device according to the invention. In contrast to the embodiment shown in FIG. 1, the holding device forms a simple bracket 33 surrounding the composite body 34, which consists of two holding plates 31, 37 of graphite and two holding rods 35 of CFC, which are not screwed to each other, but are inserted into each other and secured by means of a bolt 41.

The upper holding plate 31 and the lower holding plate 47 substantially have a rectangular shape, as shown by the top view on the upper holding plate of FIG. 4. A graphite nut 42 by means of which the holding device 33 can be held and moved within the furnace chamber 1, as is shown by the directional arrow 5, is screwed onto the upper side of the upper holding plate 31.

The soot body to be sintered is here a composite body 34 of a quartz glass tube 34 having a length of about 3 m and an outer diameter of 80 mm and of a $SiO_2$ soot layer 38 which is deposited thereon by means of a conventional OVC method and has a density of about 27% of the density of quartz glass.

For the radial centering and vertical alignment of the composite body 34 the lower holding plate 37 is provided with an upwardly projecting centering pin 43, the pin having an outer diameter adapted to the inner diameter of the quartz glass blank 39, and the lower end of the graphite nut 42 projects through the threaded bore of the upper holding plate 31 in the form of a centering pin 40 into the inner bore 16 of the quartz glass tube 39.

In this embodiment of the holding device according to the invention the inner bore 16 of the composite body 34 is free of components of graphite, apart from the centering means 40 and 43.

The quartz glass tube 39 contributes to a dimensional stabilization of the composite body 43 and the inner bore 16 during sintering, so that in this embodiment a holder at the upper end of the composite body 34 or a suspended mounting thereof can be dispensed with. Likewise the longitudinal shrinkage of the soot layer 38 is prevented or reduced through the intimate contact with the quartz glass tube 49. During the whole vitrification process the composite body 34 is therefore standing on the holding base 6 and the surrounding holding bracket 44. The weight of the composite body 34 is here carried via the holding bracket 33 and the graphite nut 42.

The vitrification process starts at the upper end or at the lower end of the composite body 34. If desired, a complete collapsing of the inner bore 15 is also possible during vitrification of the composite body 43. In this case, however, additional measures are needed for mounting the upper end for the purpose of stabilizing the sintering composite body.

The invention claimed is:

1. A method for producing a cylinder of quartz glass, said method comprising:
    sintering a $SiO_2$ body that comprises a porous $SiO_2$ soot layer and has a lower end, an upper end and an outer jacket, said $SiO_2$ body having an inner bore with an upper end, in a vitrification furnace so as to obtain the quartz glass cylinder;
    wherein said $SiO_2$ body is held using a holding device in a vertical orientation, wherein the holding device comprises an upper holding element that engages the upper end of the $SiO_2$ body in the upper end of the inner bore, and a lower holding element arranged on the lower end of the $SiO_2$ body; and
    wherein the holding device comprises dimensionally stable connection members that each extends inside the vitrification furnace along the outer jacket of the $SiO_2$ body and interconnects the upper holding element and the lower holding element; and,
    wherein the dimensionally stable connection members are holding rods interconnecting the upper holding element and the lower holding element.

2. The method according to claim 1, wherein the upper holding element, the lower holding element and the connection member form a dimensionally stable frame around the $SiO_2$ body.

3. The method according to claim 1, wherein the $SiO_2$ body rests on the lower holding element at the beginning of the Vitrification process.

4. The method according to claim 1, wherein the upper holding element is provided with a fixing element that is operative in the area of the inner bore.

5. The method according to claim 4, wherein the lower holding element is provided with a fixing element that is operative in the area of the inner bore.

6. The method according to claim 1, wherein the holding device has a cylindrical forming element that extends through said inner bore between the lower holding element and the upper holding element.

7. The method according to claim 1, wherein the $SiO_2$ body is a composite body having an inner cylinder of quartz glass and a $SiO_2$ soot layer, the $SiO_2$ soot layer being applied to the outer cylindrical jacket of the inner quartz-glass cylinder.

8. The method according to claim 1, wherein the upper holding element is provided with a vertically movable suspension.

9. A method for producing a cylinder of quartz glass, said method comprising:
    sintering a $SiO_2$ that comprises a porous $SiO_2$ soot layer and has a lower end, an upper end and an outer jacket, said $SiO_2$ body having an inner bore with an upper end, in a vitrification furnace so as to obtain the quartz glass cylinder;
    wherein said $SiO_2$ body is held using a holding device in a vertical orientation, wherein the holding device comprises an upper holding element that engages the upper end of the $SiO_2$ body in the upper end of the inner bore, and a lower holding element arranged on the lower end of the $SiO_2$ body; and
    wherein the holding device comprises a dimensionally stable connection member that extends inside the vitrification furnace along the outer jacket of the $SiO_3$ body and interconnects the upper holding element and the lower holding element; and
    wherein the upper holding element and the lower holding element are plate-shaped, cruciform or star-shaped and the dimensionally stable connection members are holding rods interconnecting the upper holding element and the lower holding element.

10. The method according to claim 9, wherein the upper holding element, the lower holding element and the connection member form a dimensionally stable frame around the $SiO_2$ body.

11. The method according to claim 9, wherein the $SiO_2$ body rests on the lower holding element at the beginning of the vitrification process.

12. The method according to claim 9, wherein the upper holding element is provided with a fixing element that is operative in the area of the inner bore.

13. The method according to claim 12, wherein the lower holding element is provided with a fixing element that is operative in the area of the inner bore.

14. The method according to claim 9, wherein the holding device has a cylindrical forming element that extends through said inner bore between the lower holding element and the upper holding element.

15. The method according to claim 9, wherein the $SiO_2$ body is a composite body having an inner cylinder of quartz glass and a $SiO_2$ soot layer, the $SiO_2$ soot layer being applied to the outer cylindrical jacket of the inner quartz-glass cylinder.

16. The method according to claim 9, wherein the upper holding element is provided with a vertically movable suspension.

* * * * *